(12) United States Patent
Hudson et al.

(10) Patent No.: US 8,262,907 B1
(45) Date of Patent: Sep. 11, 2012

(54) COMPOSITE SOCK FILTER FOR AQUARIUMS

(75) Inventors: Andrew S Hudson, South Milwaukee, WI (US); Brad L. Mihlbauer, Mukwonago, WI (US); Thomas Robert Lutz, Franklin, WI (US)

(73) Assignee: Central Garden and Pet Company, Walnut Creek, CA (US)

( * ) Notice: Subject to any disclaimer, the term of this patent is extended or adjusted under 35 U.S.C. 154(b) by 351 days.

(21) Appl. No.: 12/694,400

(22) Filed: Jan. 27, 2010

(51) Int. Cl.
*A01K 63/04* (2006.01)
*B01D 29/25* (2006.01)

(52) U.S. Cl. .................... 210/167.21; 210/232; 210/448

(58) Field of Classification Search ............ 210/167.21, 210/232, 448, 460, 473, 474, 477; 119/259
See application file for complete search history.

(56) References Cited

U.S. PATENT DOCUMENTS

| | | | |
|---|---|---|---|
| 3,960,728 A * | 6/1976 | Otzen ..................... | 210/167.01 |
| 4,622,148 A | 11/1986 | Willinger | |
| 4,891,227 A | 1/1990 | Thaman et al. | |
| 4,891,228 A | 1/1990 | Thaman et al. | |
| 5,087,357 A | 2/1992 | Villa | |
| 5,246,517 A | 9/1993 | Watson | |
| D353,649 S | 12/1994 | Willinger et al. | |
| 5,674,591 A | 10/1997 | James et al. | |
| 5,686,088 A | 11/1997 | Mitra et al. | |
| 6,484,669 B1 | 11/2002 | Mihlbauer | |
| D471,325 S | 3/2003 | Mihlbauer | |
| D472,020 S | 3/2003 | Mihlbauer | |
| 7,000,568 B1 | 2/2006 | Mihlbauer | |
| 7,134,403 B1 | 11/2006 | Mihlbauer | |
| D548,406 S | 8/2007 | Mihlbauer | |
| D565,150 S | 3/2008 | Mihlbauer et al. | |
| D565,696 S | 4/2008 | Mihlbauer et al. | |
| D570,952 S | 6/2008 | Mihlbauer et al. | |
| D571,891 S | 6/2008 | Mihlbauer et al. | |
| D598,612 S | 8/2009 | Mihlbauer | |
| 7,569,139 B2 | 8/2009 | Mihlbauer et al. | |
| 7,594,998 B2 | 9/2009 | Mihlbauer et al. | |
| 7,601,259 B2 | 10/2009 | Mihlbauer et al. | |
| 7,618,534 B2 | 11/2009 | Mihlbauer et al. | |
| 2004/0060854 A1 * | 4/2004 | Dover et al. ................. | 210/169 |
| 2006/0180534 A1 * | 8/2006 | Fox et al. ..................... | 210/169 |

* cited by examiner

*Primary Examiner* — Fred Prince
(74) *Attorney, Agent, or Firm* — Andrus, Sceales, Starke & Sawall, LLP

(57) ABSTRACT

Disclosed are vertical sock filters for aquarium filter assemblies. The sock filters typically include an annular collar coupled to filter material. The filter material typically is a composite material that includes upper material and lower material, where the upper material typically is more porous than the lower material. The assembly and the annular collar may include respective first and second coacting components that mate or interlock with each other.

14 Claims, 5 Drawing Sheets

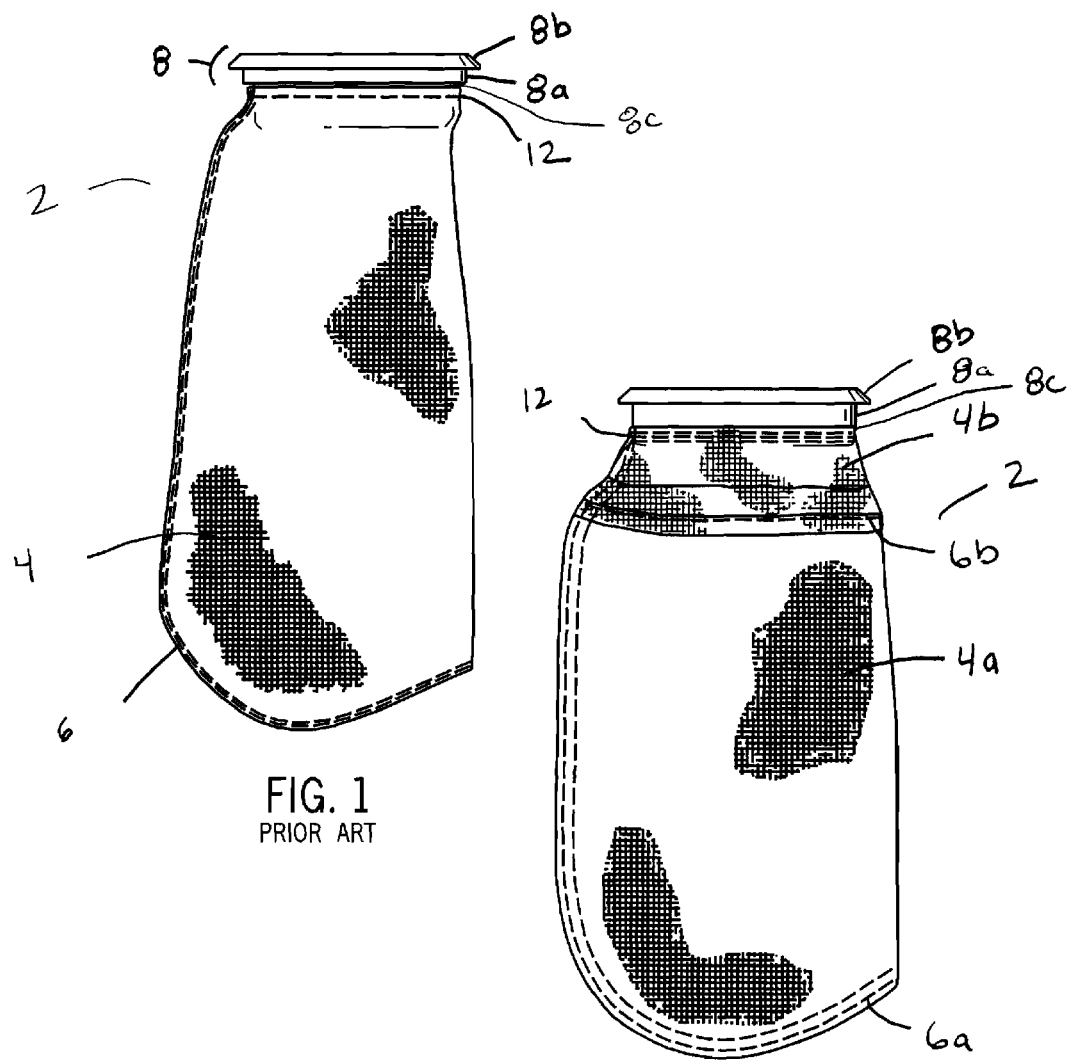

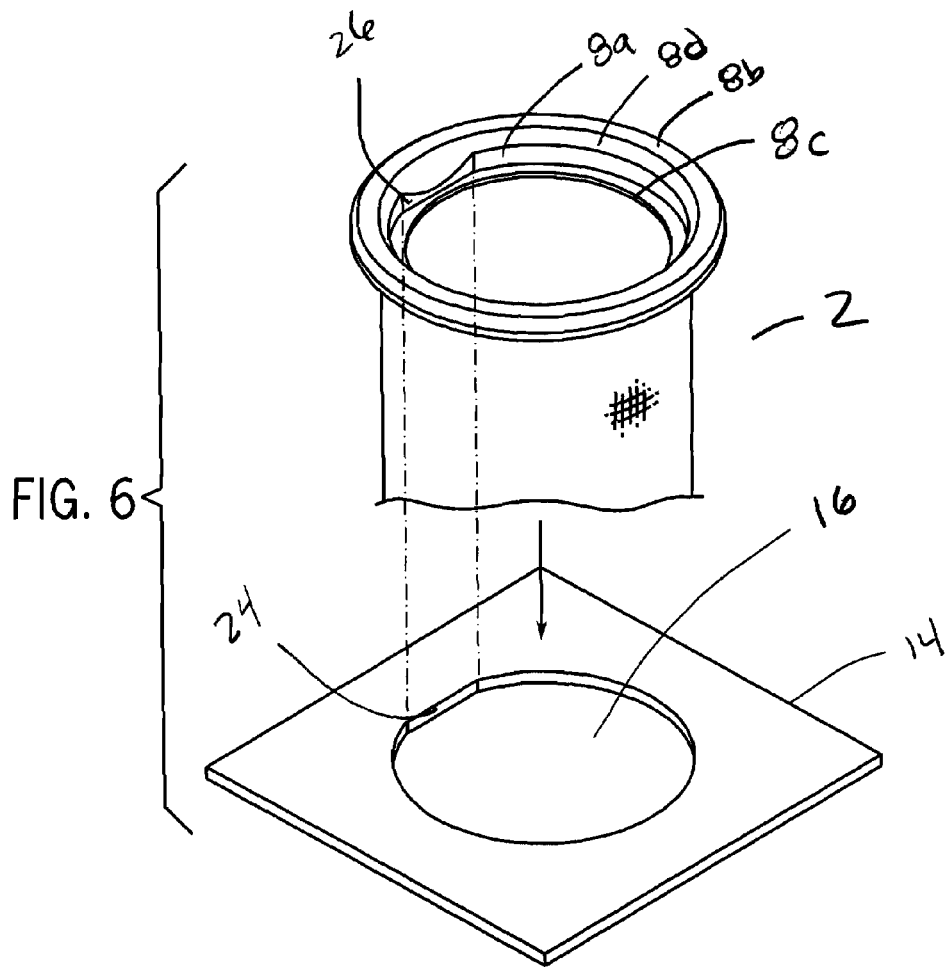
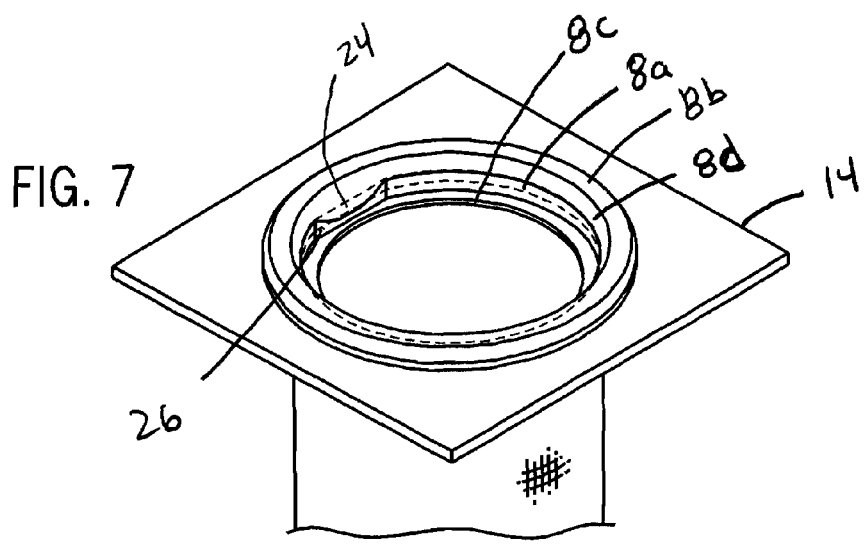

COMPOSITE SOCK FILTER FOR AQUARIUMS

BACKGROUND

The field of the invention relates to filters for aquariums. In particular, the field relates to sock filters for aquariums.

Filter apparatuses for aquariums are known in the art. For example, filter apparatuses are described in U.S. Pat. Nos. 5,246,517; 5,087,357; 4,622,148; and D353,649; the contents of which are incorporated herein by reference in their entireties. "Sock filters," also known as "bag filters," are utilized in aquarium filter apparatuses for receiving water from an aquarium tank and filtering debris. Sock filters commonly are composed of a filter material that permits water flow therethrough while retaining debris. Through extended use, as the filter material becomes clogged, water no longer flows through the sock filter. The clogged filter material retains aquarium water received from the aquarium tank and the sock filter fills with water. In vertical sock filters, aquarium water with unfiltered debris then flows over the top of the sock filter and unfiltered debris is returned to the aquarium tank. It is desirable to provide a sock filter comprising multiple graded filter material in order to prevent or delay overflow of aquarium water over the top of a clogged sock filter.

Sock filters commonly have a collar attached to the filter material. The collar is inserted into an opening in a filter apparatus such that the filter material extends vertically below the opening. It is desirable to provide a sock filter that has a collar for securing the sock filter in the filter apparatus and for orienting the sock filter in the filter apparatus.

SUMMARY

Disclosed are vertical sock filters for aquarium filter assemblies. The sock filters typically include an annular collar coupled to filter material. The filter material typically is a composite material that includes upper material and lower material. The upper material typically is more porous than the lower material. Suitable filter material may include filter mesh material.

The sock filters disclosed herein typically are utilized in aquarium filter assemblies that have an opening for receiving the sock filter. The filter material of the sock filter typically extends vertically through the opening and the annular collar sits on an upper surface of the assembly. The assembly and the annular collar may include respective first and second coacting components that mate or interlock with each other to at least one of: a) orient, align, and permit mounting of sock filter in the assembly; and b) permitting mounting only of an authorized sock filter in the assembly. In the filter assemblies, aquarium water is pumped into the sock filter which filters debris from the aquarium water as it passes through the sock filter.

BRIEF DESCRIPTION OF THE DRAWINGS

FIG. 1 provides a perspective view of a sock filter of the prior art.

FIG. 2 provides a perspective view of one embodiment of a sock filter as contemplated herein.

FIG. 6 provides a perspective view of one embodiment of a sock filter as contemplated herein being inserted in an opening of a filter assembly.

FIG. 7 provides another perspective view of the embodiment of a sock filter of FIG. 6 having been inserted in the opening of the filter assembly.

DETAILED DESCRIPTION

Figure 3:
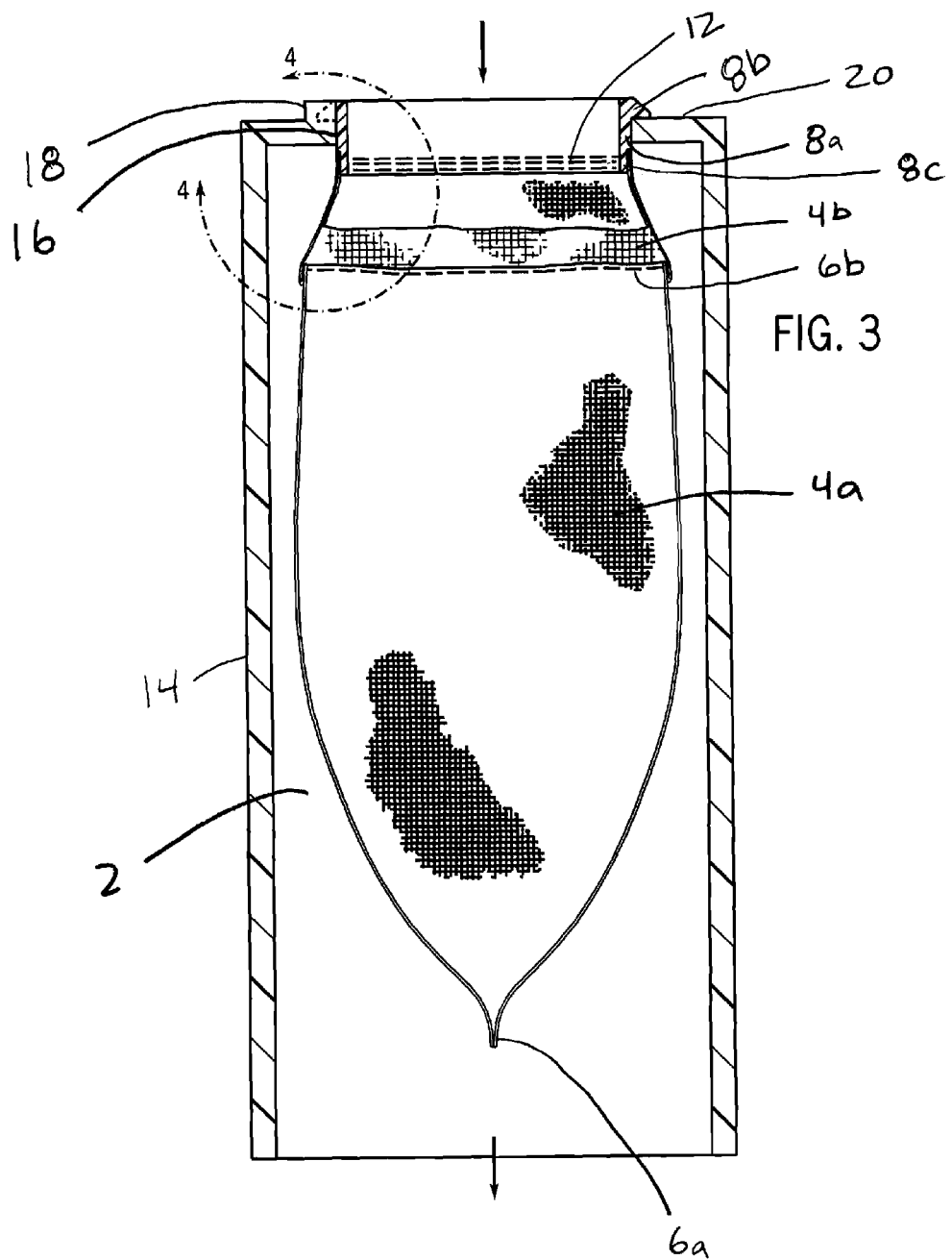
FIG. 3 provides a cross-sectional view of a one embodiment of a sock filter as contemplated herein placed in an aquarium filter assembly.

Disclosed are vertical sock filters for aquarium filter assemblies. The sock filters typically include an annular collar coupled to filter material. The filter material typically is a composite material that includes upper material and lower material. The upper material typically is more porous than the lower material, for example, such that after the lower material has become clogged with filtered debris, water may continue to flow through the upper material. In some embodiments, the filter material is filter mesh material comprising upper mesh material and lower mesh material.

As used herein, "porosity" refers to void space in a given volume of material (e.g., filter material) and may be indicated as a fraction between 0-1 or as a percentage between 0-100%. The term "porosity" is inversely proportional to the term "density." Porosity can be measure by instruments in the art, such as a porometer. The term "porosity" may refer to an "average" or "mean" value for the term (e.g., where a material is heterogenous with respect to porosity and "porosity" refers to "average porosity" for the heterogenous material). Porosity may be indicated by providing the mesh value of the material (e.g., the U.S. mesh value) or by providing the pore size of the material (e.g., as indicated in microns). Materials having a high pore size permit particles of relatively large size to pass, and conversely, materials having a low pore size only permit particles of relative small size to pass. Conversion charts for converting micron size to U.S. mesh size are available in the art. As used herein, "pore size" may refer to "average pore size" for the material.

The upper filter material of the filter socks disclosed herein typically is more porous than the lower filter material (i.e., the upper material has a higher porosity than the lower material). In some embodiment, the upper material is at least 2×, 3×, 4×, 5×, 6×, 7×, 8×, 9×, or 10× more porous than the lower filter material. In further embodiments, the lower filter material has a pore size within a range of about 50-200 microns (or about 75-175 microns, or about 100-150 microns) and the upper filter material has a pore size within a range of about 250-1000 microns (or about 300-900 microns, or about 350-750 microns). In some embodiments, the upper material represents 10-50% of total filter material of the filter sock, i.e., total of the upper material and the lower material (or the upper material represents about 10-25% of the total filter material of the filter sock, or about 10-15% of the total filter material of the filter sock).

The annular collar may be manufactured from any suitable material including, but not limited to, extruded, moldable polymer material. Suitable material for the annular collar includes thermoplastic resin material. Suitable material for the annular collar may include, but is not limited to, acetal material, acrylic material, polyamide material (such as nylon material), polystyrene material, acrylonitrile butadiene styrene (ABS) material, and polycarbonate material.

The filter material may include woven or non-woven material. Non-woven fibrous materials are known in the art. (See, e.g., Riedel, "Nonwoven Bonding Methods and Materials,"

Nonwoven World (1987); and U.S. Pat. Nos. 5,686,088; 5,674,591; 4,891,228; and 4,891,227; the contents of which are incorporate by reference herein in their entireties.) In some embodiments, the filter material is mesh material. In other embodiments, the filter material includes randomly disposed fibrous or filamentary material which forms a filamentary matrix having a defined density. In some embodiments, the filter material includes a plurality of fibers. Suitable filter material may include, but is not limited to, polymeric material, which optionally may be foamed polymeric material. Suitable polymeric material may include, but is not limited to, polyurethanes, including a polyether-polyurethane foam or a polyester polyurethane foam; polyesters; olefin polymers, such as a polypropylene or polyethylene; vinyl and styrene polymers such as polyvinylchloride; and polyamides such as nylon. Other suitable filter material may include, but is not limited to, glass material, silk material, cotton material, and cellulose material.

The filter material is coupled to the annular collar by suitable coupling structures or mechanisms which may include, but are not limited to, stitching, thermal welding, sonic welding, and applying an adhesive. The filter material typically comprises upper filter material and lower filter material, which are coupled by suitable coupling structures or mechanisms which may include, but are not limited to, stitching, thermal welding, sonic welding, and applying an adhesive. The filter sock may be formed by folding the filter material approximately in half and coupling the two folded halves of the filter material to form a sock by suitable coupling structures or mechanisms which may include, but are not limited to, stitching, thermal welding, sonic welding, and applying an adhesive.

The disclosed sock filters are configured for use in aquarium filter assemblies. The assemblies typically include an opening for receiving the sock filter in which the filter material of the sock filter extends vertically through the opening and the annular collar of the sock filter sits on an upper surface of the assembly. The assembly includes a pump which pumps water from an aquarium tank into the filter sock. The assembly is configured such that water passing through the filter sock is returned to the aquarium tank.

In some embodiments, the assembly and the annular collar may include respective first and second coacting components that mate or interlock with each other to at least one of: a) orient, align, and permit mounting of the sock filter in the assembly; and b) permit mounting only of an authorized sock filter in the assembly. For example, the assembly and annular collar together may include mating or interlocking male and female components for aligning the sock filter in the assembly. In some embodiments, the annular collar may include a female component that mates or interlocks with a male component present on the assembly. In further embodiments, the female component is a notch present in the annular collar and the male component is a key present on a surface of the assembly, where the key is adjacent to the opening for receiving the sock filter and the notch and key mate or interlock. In another embodiment, the female component is a chord present on a perimeter of the annular collar and the male component is a chord present on a perimeter of the opening for receiving the annular collar, such that the chords mate or interlock.

Referring now to the figures, FIG. 1 provides a perspective view of a sock filter 2 of the prior art. The sock filter 2 includes an annular collar 8 coupled to filter material 4. The filter material 4 is folded horizontally in half and forms a sock structure in which the two halves are coupled via double stitching 6. The annular collar includes an outer annular neck 8a, an annular rim 8b, and an inner annular neck 8c to which the filter material 4 is coupled via stitching 12.

FIG. 2 provides a perspective view of one embodiment of a sock filter 2 as contemplated herein. The sock filter 2 includes an annular collar 8 coupled to filter material 4. The filter material 4 comprises lower filter material 4a and upper filter material 4b which are coupled by stitching 6b. The filter material is folded horizontally in half and forms a sock structure in which the two folded halves are coupled via double stitching 6a. The annular collar includes an outer annular neck 8a, an annular rim 8b, and an inner annular neck 8c to which the filter material 4 is coupled via stitching 12.

Figure 4:
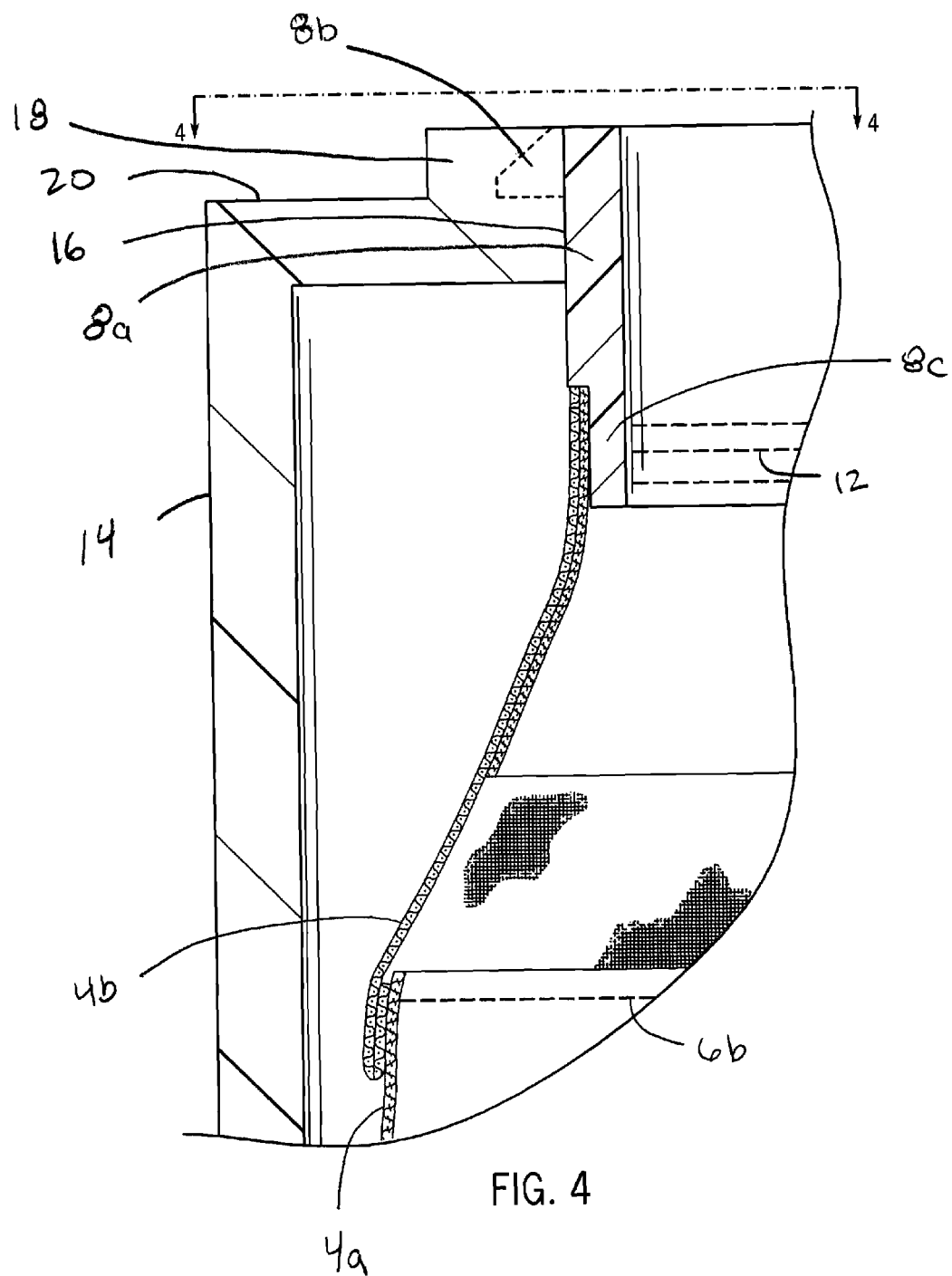
FIG. 4 provides an expanded cut-out view along line 4-4 of FIG. 3.
Figure 5:
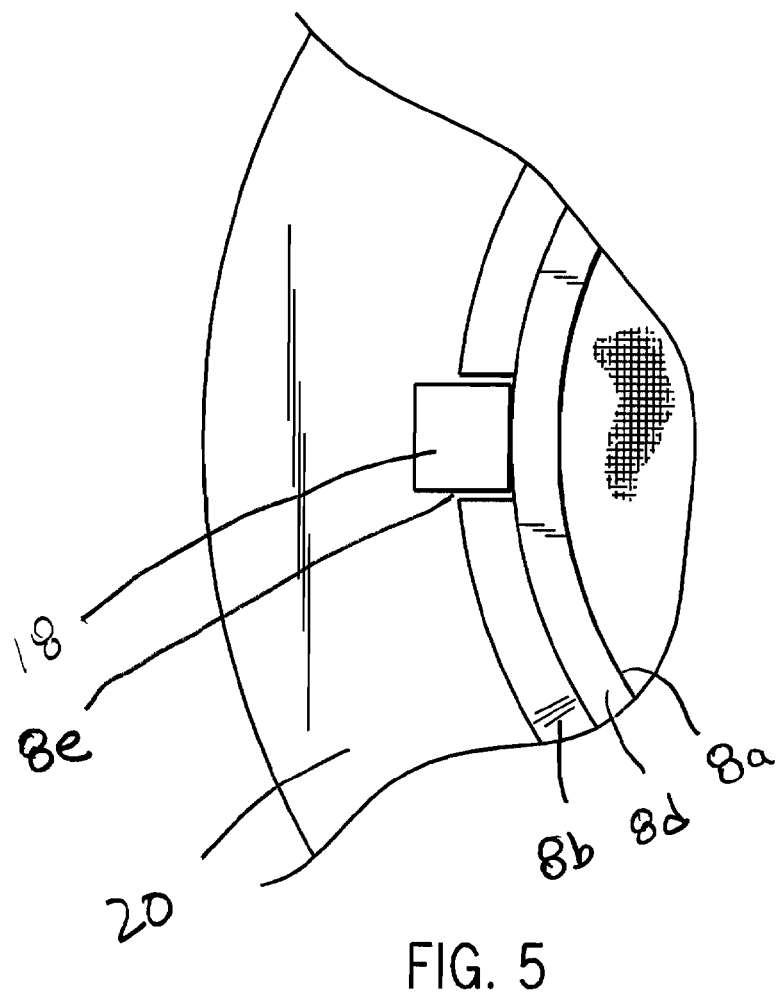
FIG. 5 provides a partial top view of one embodiment of a sock filter as contemplated herein placed in an aquarium filter assembly.

FIG. 3 provides a cross-sectional view of one embodiment of a sock filter 2 as contemplated herein placed in an aquarium filter assembly 14. FIG. 4 provides an expanded cut-out view along line 4-4 of FIG. 3. FIG. 5 provides a partial top view of one embodiment of a sock filter 2 as contemplated herein placed in an aquarium filter assembly 14. The assembly 14 has an opening 16 for receiving the sock filter 2. (FIGS. 3 and 4). The annular collar 8 sits on an upper surface of the assembly 20 adjacent the opening 16 via the annular rim 8b. (FIGS. 3 and 4). The assembly 14 has a key 18 that mates with a notch 8e present in the annular rim 8b of the annular collar 8. (FIGS. 3-5). Also shown is a beveled upper edge 8d of the annular collar. (FIG. 5). The key 18 and notch 8e mate to align the sock filter 2 in the filter assembly 14. (FIG. 5).

FIG. 6 provides a perspective view of one embodiment of a sock filter 2 as contemplated herein being inserted in an opening 16 of a filter assembly 14. The annular collar 8 includes a chord 26 present on the perimeter of the outer annular neck 8a. The opening of the filter assembly 14 includes a chord 24 present on the perimeter of the opening 16 for receiving the sock filter 2. FIG. 7 provides another perspective view of the embodiment of a sock filter 2 of FIG. 6 having been inserted in the opening 16 of the filter assembly 14. The chord 26 present on the perimeter of the outer annular neck 8a and the chord 24 present on the perimeter of the opening 16 for receiving the sock filter 2 mate to align the sock filter 2 in the filter assembly 14.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

The invention claimed is:

1. A vertical sock filter for an aquarium filter assembly, the sock filter comprising an annular collar coupled to filter material, the filter material comprising upper filter material and lower filter material, wherein the upper filter material is at least about twice as porous as the lower filter material, the assembly comprising an opening for receiving the sock filter, the filter material extending vertically through the opening when the annular collar is placed on an upper surface of the assembly, the assembly and annular collar together comprising mating male and female components for aligning the sock filter in the assembly.

2. The sock filter of claim 1, wherein the annular collar comprises the female component.

3. The sock filter of claim 2, wherein the female component is a notch present in the annular collar.

4. The sock filter of claim 3, wherein the male component is a key present on a surface of the assembly adjacent to the opening.

5. The sock filter of claim 2, wherein the female component is a chord present on a perimeter of the annular collar.

6. The sock filter of claim 5, wherein the male component is a chord present on a perimeter of the opening.

7. A vertical sock filter for an aquarium filter assembly, the sock filter comprising an annular collar coupled to filter material, the filter material comprising upper filter material and lower filter material, wherein the upper filter material is at least about twice as porous as the lower filter material, the assembly comprising an opening for receiving the sock filter, the annular collar comprising an annular neck and an annular rim, the filter material extending vertically through the opening when the annular rim is placed on an upper surface of the assembly, the annular rim comprising a notch and the assembly comprising a key for aligning the sock filter in the assembly.

8. A vertical sock filter for an aquarium filter assembly, the sock filter comprising an annular collar coupled to filter material, the filter material comprising upper filter material and lower filter material, wherein the upper filter material is at least about twice as porous as the lower filter material, the assembly comprising an opening for receiving the sock filter, the annular collar comprising an annular neck and an annular rim, the filter material extending vertically through the opening when the annular rim placed on an upper surface of the assembly, the annular neck and opening comprising chords for aligning the sock filter in the assembly.

9. A vertical sock filter for an aquarium filter assembly, the sock filter comprising an annular collar coupled to filter material, the filter material comprising upper filter material and lower filter material, wherein the upper filter material is at least about twice as porous as the lower filter material, the assembly comprising an opening for receiving the sock filter, the filter material extending vertically through the opening when the annular collar is placed on an upper surface of the assembly, the assembly and annular collar together comprising mating male and female components for aligning the sock filter in the assembly, wherein the lower filter material has a pore size within a range of about 50-200 microns and the upper filter material has a pore size within a range of about 250-1000 microns.

10. The sock filter of claim 9, wherein the lower filter material has a pore size within a range of about 75-175 and the upper filter material has a pore size within a range of about 300-900 microns.

11. The sock filter of claim 9, wherein the lower filter material has a pore size within a range of about 100-150 and the upper filter material has a pore size within a range of about 350-750 microns.

12. A vertical sock filter for an aquarium filter assembly, the sock filter comprising an annular collar coupled to filter material, the filter material comprising upper filter material and lower filter material, wherein the upper filter material is at least about twice as porous as the lower filter material, the assembly comprising an opening for receiving the sock filter, the filter material extending vertically through the opening when the annular collar is placed on an upper surface of the assembly, the assembly and annular collar together comprising mating male and female components for aligning the sock filter in the assembly, wherein the upper filter material represents 10-50% of the filter material.

13. The sock filter of claim 12, wherein the upper filter material represents 10-25% of the filter material.

14. The sock filter of claim 12, wherein the upper filter material represents 10-15% of the filter material.

\* \* \* \* \*